Sept. 10, 1968 A. H. CORNWALL 3,400,629

CODING AND DECODING OF DOCUMENTS

Filed March 29, 1965 8 Sheets-Sheet 1

Inventor
Alfred Hans Cornwall
By Cushman, Darby & Cushman
Attorneys

CODING AND DECODING OF DOCUMENTS

Filed March 29, 1965 8 Sheets-Sheet 2

Inventor
Alfred Hans Cornwall
By Cushman, Darby & Cushman
Attorneys

Inventor
Alfred Hans Cornwall
By Cushman, Darby & Cushman
Attorneys

Sept. 10, 1968 A. H. CORNWALL 3,400,629

CODING AND DECODING OF DOCUMENTS

Filed March 29, 1965 8 Sheets-Sheet 4

Inventor
Alfred Hans Cornwall
By Cushman, Darby & Cushman
Attorneys

Inventor
Alfred Hans Cornwall
By Cushman, Darby & Cushman
Attorneys

Sept. 10, 1968 A. H. CORNWALL 3,400,629

CODING AND DECODING OF DOCUMENTS

Filed March 29, 1965 8 Sheets-Sheet 6

Inventor
Alfred Hans Cornwall
By Cushman, Darby & Cushman
Attorneys

Sept. 10, 1968 A. H. CORNWALL 3,400,629

CODING AND DECODING OF DOCUMENTS

Filed March 29, 1965 8 Sheets-Sheet 7

Inventor
Alfred Hans Cornwall
By Cushman, Darby & Cushman
Attorneys

CODING AND DECODING OF DOCUMENTS

Filed March 29, 1965 8 Sheets-Sheet 8

Inventor
Alfred Hans Cornwall
By Cushman, Darby & Cushman
Attorneys

United States Patent Office 3,400,629
Patented Sept. 10, 1968

3,400,629

CODING AND DECODING OF DOCUMENTS

Alfred Hans Cornwall, Britannica House, Waltham Cross, Hertfordshire, England

Filed Mar. 29, 1965, Ser. No. 443,463
Claims priority, application Great Britain, Apr. 3, 1964, 13,948/64
8 Claims. (Cl. 88—24)

ABSTRACT OF THE DISCLOSURE

Method and apparatus for encoding documentary material wherein the image of a subject is projected onto a photographic sensitized surface by an optical system which controllably causes rotational and translational displacement factors of the image on the sensitized surface to produce a coded representation. To render the coded representation unintelligible, the sensitized surface is sequentially exposed by the subject and a screen having opaque and translucent areas. Displacement factors are employed for each sequential exposure. A second coded representation is obtained by sequentially exposing a second sensitized surface by the image of the subject and a second screen having reversal translucent and opaque areas and employing preferably different displacement factors. The encoding procedure may also be accomplished by reversing the subject and/or the screens. The optical apparatus includes a lens system mounted in a housing and means for translating the lens system in a plane perpendicular to the optical axis of the system to thereby effect the aforementioned translational displacement factors. Rotational displacement factors are achieved by employing the combination of light reflective surfaces for reflecting light rays away from and back to the optical axis and means for rotating said light reflective surfaces about said optical axis.

This invention relates to a method of and apparatus for the coding and decoding of a document, the term "document" as used herein meaning a two-dimensional representation, such as a sheet containing written or printed matter, a drawing, or other configuration.

An object of the invention is to provide for the coding of a document in order to present the latter in unrecognisable form which can then be stored or transmitted while preserving the secrecy of the documentary matter concerned. The original document or documentary matter to be reproduced in coded form is herein referred to as the "subject."

In accordance with the invention there is provided a method of forming a coded representation of a documentary subject, the method comprising the steps of exposing a photographic sensitized surface to images of which at least one is a representation of the original subject, applying displacement factors for such exposures so that elements of said images are displaced relatively to corresponding elements in the original representations, thereby to produce on said sensitized surface a scrambled and unintelligible coded representation.

The invention further provides apparatus for the coding or decoding of a documentary subject, said apparatus comprising a housing, first and second object holders spaced from one another and carried by the housing, means for projecting an image of a subject from one holder to the other, displacement means to enable an image when projected from one holder to be displaced in position relatively to the other holder by a desired displacement factor, and mechanism for controlling operation of said displacement means.

For a better understanding of the invention the same will now be more fully described, by way of example, with reference to the accompanying diagrammatic drawings, in which.

Figure 20:
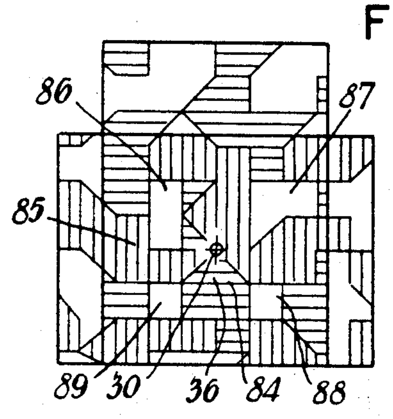
Figure 21:
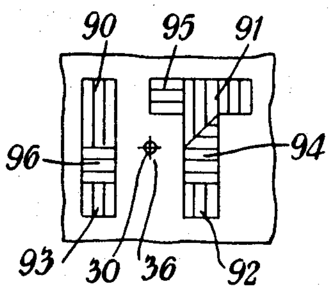
Figure 22:
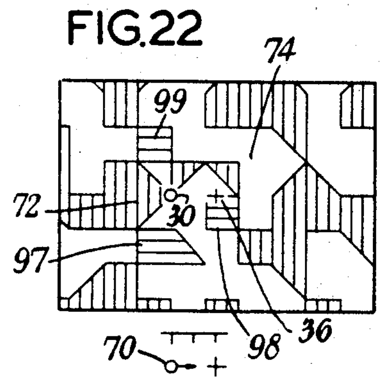
Figure 23:
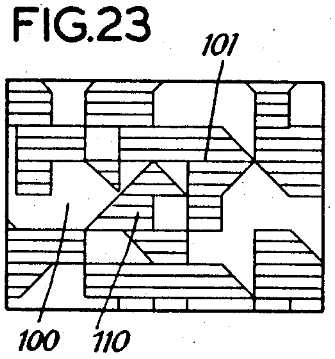
Figure 24:
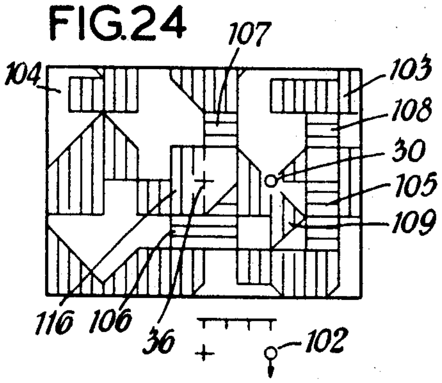
Figure 25:
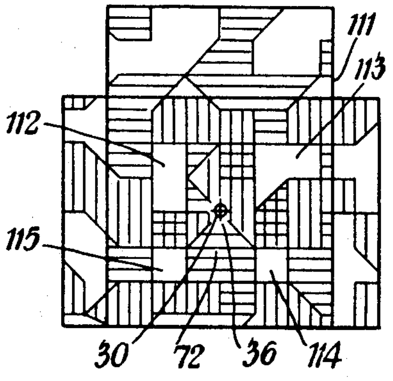
Figure 26:
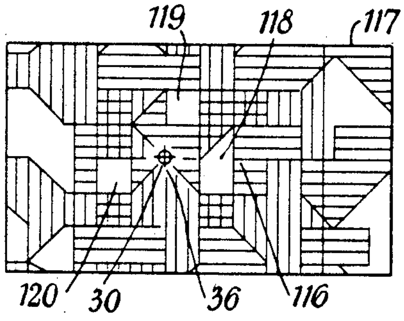
Figure 33:
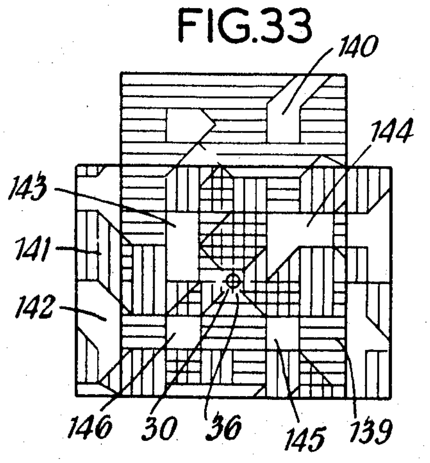
Figure 34:
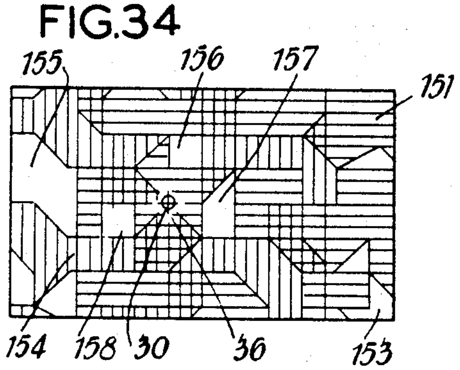
Figure 35:
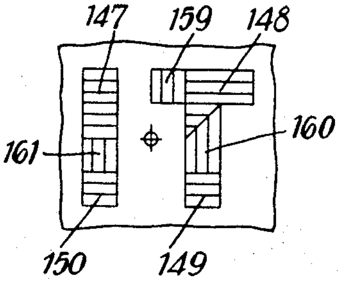
Figure 36:
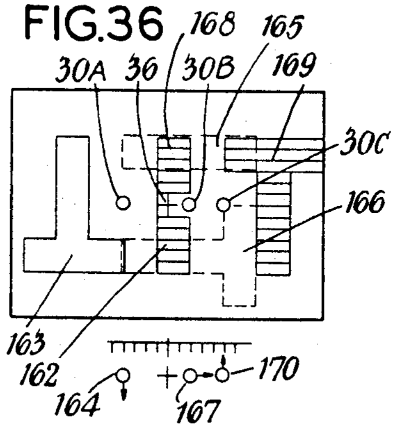
Figure 37:
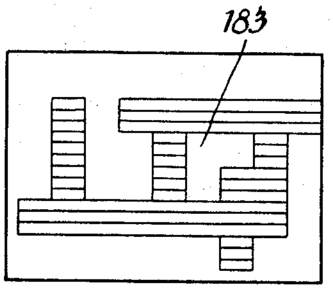
Figure 38:
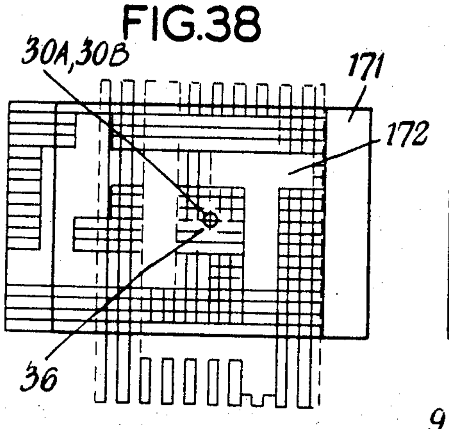
Figure 39:
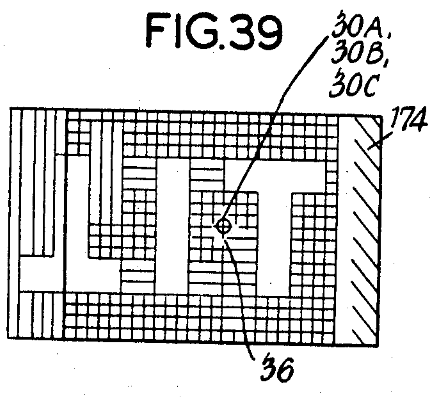
Figure 40:
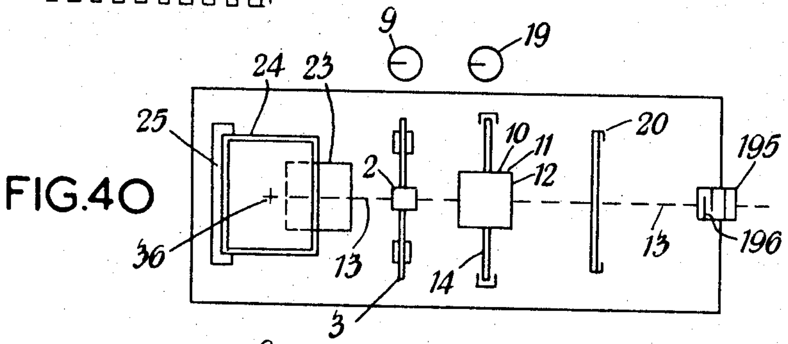

FIGURES *7a* and *7b* illustrate examples of symbols used to indicate displacement factors in a coding and decoding process;

FIGURES 8 to 11 illustrate a coding process according to a first example;

FIGURES 12 to 15 illustrate a corresponding decoding process;

FIGURES 16 to 19 illustrate a coding process according to a second example;

FIGURES 20 and 21 illustrate a corresponding decoding process;

FIGURES 22 to 24 illustrate a coding process according to a third example;

FIGURES 25 and 26 illustrate a corresponding decoding process;

FIGURES 27 to 32 illustrate a coding process according to a fourth example;

FIGURES 33 to 35 illustrate a corresponding decoding process;

FIGURES 36 and 37 illustrate a coding process according to a fifth example;

FIGURES 38 and 39 illustrate the corresponding decoding process;

FIGURE 40 is a plan view of the apparatus according to a second embodiment; and

Figure 41:
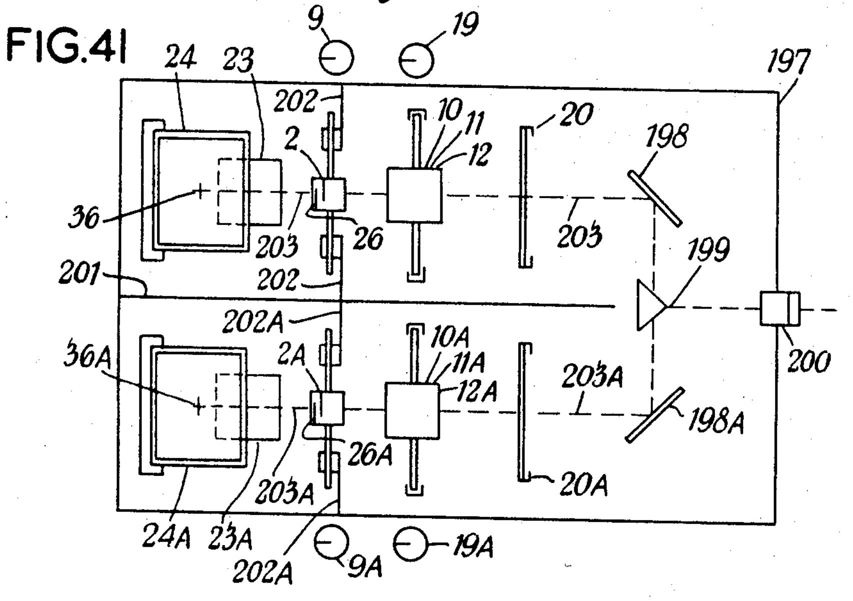

FIGURE 41 is a plan view of the apparatus according to a further embodiment.

Figure 1:
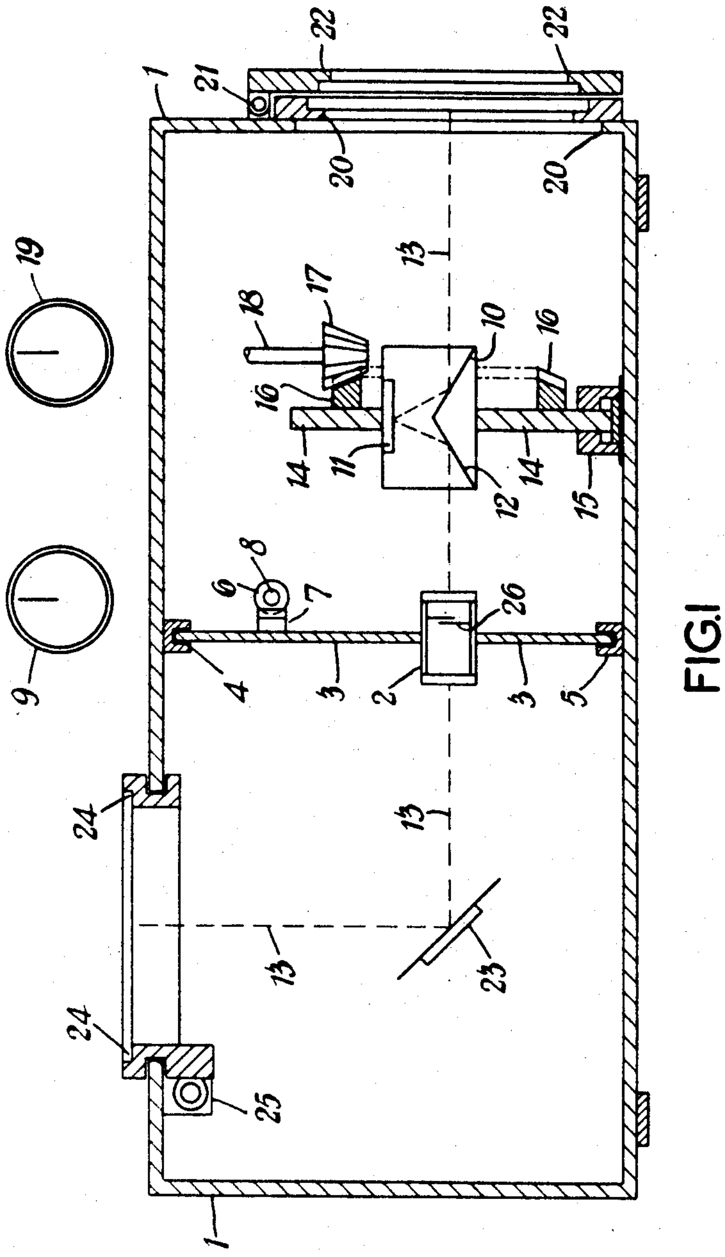
FIGURE 1 is a longitudinal sectional view in a vertical plane, of apparatus according to one embodiment of the invention.

Referring to FIGURE 1, the coding and decoding apparatus comprises a rectangular box-like housing 1 containing a lens system 2 which incorporates a shutter 26 and which is mounted in a vertical plate 3. This plate is slidably mounted in upper and lower guide channels 4 and 5 which are arranged within the housing 1 and permit sliding movement of the plate in a direction transversely of the housing. A worm 6 engages a toothed rack 7 which is mounted on the plate 3. The worm 6 is mounted on and rotatable by a spindle 8 rotatably supported in the housing and having a knob (not shown) operable from the exterior of the housing to produce movement of the plate 3 and the lens system 2 thereby to effect a linear horizontal displacement of the lens system 2. The spindle 8 is operatively connected to a dial gauge 9 so that movement of the plate 3 and the lens system 2 is transferred to the dial gauge 9 which indicates the position of the lens system 2. In FIGURE 1, the lens system 2 is shown in a neutral or zero position in which it is centred on a line 13.

The housing 1 furthermore contains an assembly of mirrors or prisms 10, 11, and 12. This mirror assembly is such that a light beam projected from the right-hand end of the housing along the line 13 and reaching the mirror 10 is deflected laterally onto the mirror 11 and from there onto the mirror 12 whence the beam continues in the same line as that in which it reached the mirror 10. The line 13 represents the optical axis of the mirror assembly 10, 11, 12 and also of the lens system 2, if the latter has not been displaced from its neutral or zero position. If the light beam 13 is taken to represent the image of a subject projected onto the mirror 10 a rotation of the mirror assembly 10, 11, 12 around its optical axis 13 will cause the image reflected from the mirror 12 to rotate in like manner. The extent of the rotational displacement of the image corresponds to twice the rotational displacement of the mirror assembly 10, 11, 12.

The mirror assembly 10, 11, 12 is mounted in a circular plate 14 which can rotate in bearings such as the one shown under 15, the circular plate 14 being so dimensioned and the bearings 15 being so positioned about the periphery of the plate 14 that the rotation of the plate 14 and the mirror assembly 10, 11, 12, takes place around the optical axis 13 of the system. On the circular plate 14 is mounted a toothed ring 16 engaging a bevel pinion 17. By means of a suitably mounted spindle 18 and a knob (not shown) mounted on the outside of the housing 1, the crown wheel 17 can be rotated thereby to effect rotation of the plate 14 holding the mirror assembly 10, 11, 12. The spindle 18 is operatively connected to a dial gauge 19 so that rotational movement of the plate 14 is transferred to the dial gauge 19 which indicates the position of the mirror system 10, 11, 12 relative to its neutral or zero position.

In register with an opening at the right-hand end of the housing there is mounted a plate or film holder 20 and by means of a hinge 21 a frame 22 designed to hold a further plate or film. A mirror 23 is so arranged within the housing that a light beam 13 projected through the mirror assembly 10, 11, 12 and the lens system 2, is deflected by the mirror 23 onto a plate or film held in a plateholder 24. The plateholder 24 is mounted in register with an opening at the top of the housing 1 in such a manner that the position of the plateholder 24 relatively to the associated opening in the housing 1 can be altered within relatively small limits by means, for example, of a rack and pinion mechanism 25.

When a plate or film bearing a documentary subject is placed in the plateholder 22 and a suitable light source is positioned to illuminate the subject, an image thereof is projected via the mirrors 10, 11, 12, onto the lens system 2. When the shutter 26 is opened, the image is projected via the mirror 23 onto a plate or film held in the plateholder 24. The position of the subject's image on the plate or film held in the plateholder 24 will depend on the positions of the lens system 2 and the mirror assembly 10, 11, 12, respectively. When both the lens system 2 and the mirror assembly 10, 11, 12, are in their neutral or zero position the geometrical centre of the projected subject's image will coincide with the geometrical centre of the film held in plateholder 24 and also with the system's optical axis 13. A displacement of either the lens system 2 or the mirror assembly 10, 11, 12, will effect a displacement of the image projected onto the plate or film held in plateholder 24 and the extent of such displacement is indicated by the dial gauges 9 and 19. Conversely, if a plate or film bearing a photographic representation is placed into the plate holder 24 and suitably illuminated, its images will be projected via the mirror 23, the lens system 2 and, when the shutter 26 is opened, via the mirror assembly 10, 11, 12 onto a plate or film held in the hinged plateholder 22.

The apparatus functions as follows:

A documentary subject or a photograph of a documentary subject is placed in the plateholder 22 and illuminated by a suitable light source. The image of the subject is projected via the mirror assembly 10, 11, 12, onto the lens system 2 and, when the shutter 26 is opened, via the mirror 23 onto a photographic sensitized plate or film held in plateholder 24 which can then be exposed to the image of the documentary subject. The position of this image on the plate or film held in plateholder 24 is determined by the position of the lens system 2 indicated by the dial gauge 9 and the position of the mirror assembly 10, 11, 12, indicated by the dial gauge 19. After developing, the plate or film can be reinserted in the plateholder 24 and, suitably illuminated, projected back via the mirror 23 onto the lens system 2 and, when the shutter 26 is opened, via the mirror assembly 10, 11, 12, onto a plate or film held in the plateholder 22.

The position of the image on the plate or film held in plateholder 22 will again depend on the position of the lens system 2 indicated by the dial gauge 9 and the position of the mirror assembly 10, 11, 12, indicated by the dial gauge 19. If the position of the lens system and mirror assembly at the second or reversed projection is the same as the one they occupied when the first exposure was made, then the position of the image on the plate or film held in the plateholder 22 will correspond to the position of the original documentary subject. If the optical system of the apparatus is designed to give a reproduction ratio of 1:1, then the size of the image reproduced by the reversed projection onto the film or plate held in plateholder 22 will also correspond to the size of the original documentary subject.

So far, the simple process of exposure and projection of the exposed and developed plate or film was described in order to demonstrate the effect of image movements by displacing the lens system 2 and the mirror assembly 10, 11, 12. The extent of these displacements indicated by the dial gauges 9 and 19 respectively will be referred to herein as "displacement factors."

The processes described so far are concerned only with a change of image position during exposure and projection. In order to bring about a change in the nature and appearance of a subject's image a further element is required, that is, a screen which, during certain phases of the exposure and projection sequences, is inserted in the plateholder 20 in such a manner that it is in close proximity to the documentary subject held in plateholder 22 or, alternatively, to the light sensitive emulsion of a plate or film if the latter is inserted in the plateholder 22 when reversed projection takes place.

In the examples now to be described the aforementioned apparatus is employed in the making of sequences of photographic exposures by projecting images of the subject and of other elements onto light sensitive material hereafter referred to generally as "film." It will be understood throughout that after exposure the film may be developed in accordance with normal photographic practice and that generally the intensity of light sources and the duration of exposures are chosen as suitable to the type of photographic material used. It is also assumed that the reproduction ratio of the apparatus is 1:1.

Figure 2:
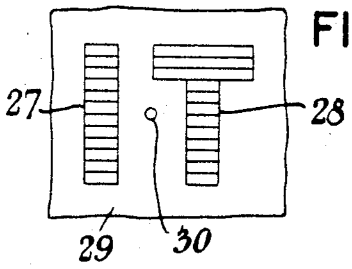
FIGURES 2 and 3 illustrate an example of a documentary subject which is to be coded.
Figure 3:
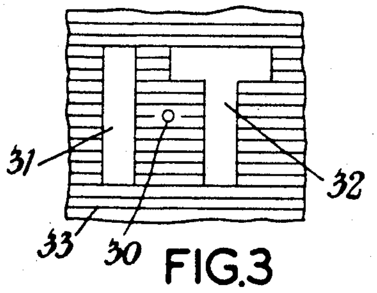

In the examples, a simple form of lettering, FIGURE 2, is chosen as a subject, it being assumed that this forms part of a documentary subject, the secrecy of which is to be preserved, and which is to be coded. The subject consists of opaque areas 27 and 28, surrounded by a translucent area 29. Some of the examples require a reversal of the subject, shown in FIGURE 3, where the translucent areas 31 and 32 correspond to the opaque areas 27 and 28 in FIGURE 2 respectively, the opaque surrounding area 33 corresponding to the translucent area 29 of FIGURE 2. The point 30 in FIGURE 2 and in FIGURE 3 represents the geometrical centre of the subject. When the subject is inserted in the plateholder 22 (FIGURE 1) the point 30 in FIGURE 2 and FIGURE 3 coincides with the optical axis 13, FIGURE 1.

The area 34 (FIGURE 4) represents the area of the subject's image when projected as described onto a film held in plateholder 24 (FIGURE 1). The area 35 (FIGURE 4) represents the exposable area of the film held in plateholder 24 (FIGURE 1). The point 36 (FIGURE 4) is the geometrical centre of the area 35 coinciding with the geometrical centre 30 of the subject's image and also with the optical axis of the system 13 (FIGURE 1) if both the lens system 2 and the mirror assembly 10, 11, 12, FIGURE 1, are in their neutral or zero position which obtains when no displacement factors are applied. The image area 34 (FIGURE 4) is preferably smaller than the exposable film area 35 in order to allow for movement of the image area caused by applying displacement factors as a result of displacing the lens system 2 or the mirror assembly 10, 11, 12, FIGURE 1.

Figure 5:
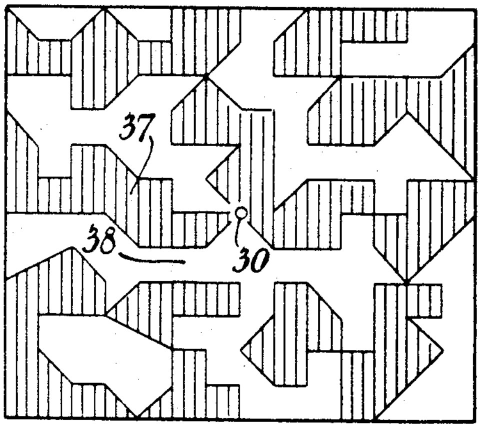
FIGURES 5 and 6 illustrate screen elements for use in a coding and decoding process.
Figure 6:
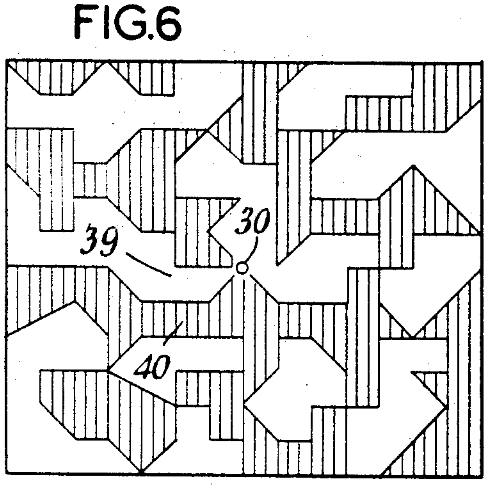

FIGURE 5 illustrates an example of a "screen" which may be inserted into the plateholder 20 (FIGURE 1). The screen consists of a random distribution of irregularly shaped opaque and translucent areas. The opaque areas are indicated in FIGURE 5 by vertical lines and one such area is identified under 37. One of the translucent areas in FIGURE 5 is identified under 38. In some of the examples, the coding process requires a reversal of the screen which is shown in FIGURE 6 where the opaque areas in FIGURE 5 appear as translucent areas in FIGURE 6, and the translucent areas in FIGURE 5 appear as opaque areas indicated by vertical lines in FIGURE 6. Accordingly, the opaque area 37 in FIGURE 5 appears as the translucent area 39 in FIGURE 6 and the translucent area 38 in FIGURE 5 appears as the opaque area 40 in FIGURE 6. The point 30 in FIGURE 5 and FIGURE 6 represents the geometrical centre of the screens and when either of the screens is inserted in the plateholder 20 (FIGURE 1), the point 30 (FIGURES 5 and 6) coincides with the optical axis 13 (FIGURE 1). The area of the screen to be inserted in plateholder 20 (FIGURE 1) is preferably larger than the exposable area of the film which is inserted in the plateholder 24 (FIGURE 1) so that the whole of the exposable film area can be exposed to the image of the screen even when extreme displacement factors are applied.

Figure 7A:
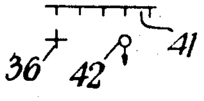
Figure 7B:
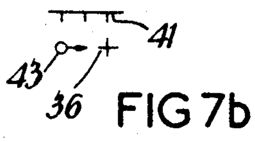

FIGURES 7*a* and 7*b* illustrate the symbols used hereafter to denote the displacement factors applied to the lens system 2 and the mirror assembly 10, 11, 12, FIGURE 1, the movements of which produce, as described, a change of the position of the subject's image projected onto a film held in plateholder 24 (FIGURE 1), relative to the optical axis of the apparatus 13 (FIGURE 1). The axis 13 (FIGURE 1) coincides with the geometrical centre 30 (FIGURE 2 and FIGURE 3) of the subject inserted in plateholder 22 (FIGURE 1) and also with the geometrical centre of the exposable area of the film 36 (FIGURE 4) held in plateholder 24 (FIGURE 1) when no displacement factors are applied. In FIGURES 7*a* and 7*b*, the point 36 indicates the optical axis 13 (FIGURE 1) of the system.

A displacement of the lens system 2 (FIGURE 1) is shown against a scale 41 (FIGURES 7*a*, 7*b*) by the position of the point 42. The arrow at point 42 indicates the rotational displacement of the image on the film held in plateholder 24 (FIGURE 1) brought about by rotation of the mirror assembly 10, 11, 12, FIGURE 1.

The example shown in FIGURE 7*a* denotes a horizontal displacement of the lens system 2 (FIGURE 1) by 3 units in one direction relative to the optical axis denoted by point 36. The position of the arrow at point 42 denotes a rotational movement of the projected image by 180 degrees from its neutral or zero position. The symbols shown in FIGURE 7*a* represent displacement factors which can be described as "plus 3, plus 180 degrees." Likewise the example shown in FIGURE 7*b* indicates by the position of the point 43 relative to the point 36 displacement factors of "minus 2 plus 90 degrees." These displacement factors are indicated in suitable manner on the dial gauges 9 and 19 in FIGURE 1.

EXAMPLE 1

Figure 4:
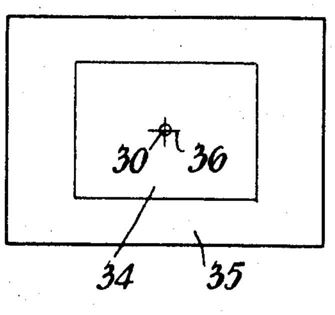
FIGURE 4 illustrates a photographic element for a coding and decoding process.
Figure 8:
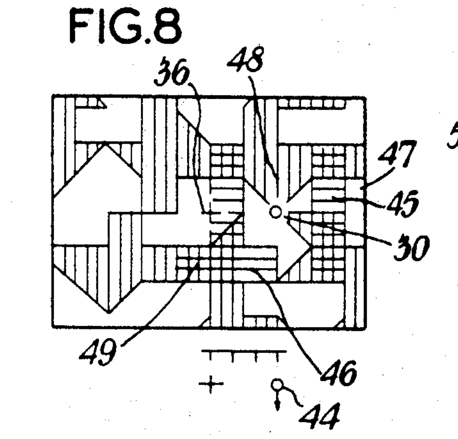

FIGURE 8 illustrates the first step of a coding process. A subject as shown in FIGURE 3 is placed in the plateholder 22 (FIGURE 1) and projected in the described manner onto a film held in plateholder 24, FIGURE 1, applying displacement factors of "plus 3, plus 180 degrees" as illustrated in the example of FIGURE 7*a* and indicated in FIGURE 8 by the symbol 44. The subject's image as it would appear if the film were developed is shown in FIGURE 8 in which the opaque areas 45 and 46 indicated by horizontal lines, correspond to the translucent areas 31 and 32 respectively in FIGURE 3. The area not containing horizontal lines in FIGURE 8 corresponds to the opaque area 33 in FIGURE 3. In accordance with the applied displacement factors the geometrical centre 30 of the subject's image (FIGURE 3 and FIGURE 8) is displaced relative to the optical axis 36 (FIGURE 4 and FIGURE 8).

After the film held in plateholder 24 (FIGURE 1) has been exposed in the described manner the subject is removed from plate holder 22 (FIGURE 1) and a screen as shown in FIGURE 5 is inserted in the plateholder 20, FIGURE 1. Without changing the displacement factors applied to the previous exposure a second exposure is made on the same film. The screen's image as it would appear if the film were developed is shown in FIGURE 8 in which the opaque areas, indicated by vertical lines, correspond to the translucent areas of the screen, FIGURE 5, the opaque area 48 (FIGURE 8) for example corresponding to the translucent area 38 in FIGURE 5. The areas in FIGURE 8 not containing vertical lines correspond to the opaque areas of the screen FIGURE 5, the area 47 (FIGURE 8) for example corresponding to the opaque area 37 in FIGURE 5. The areas shown by both horizontal and vertical lines in FIGURE 8, such as the one shown under 49, are those which have been exposed twice, first by a translucent area of the subject, FIGURE 3, and second by a translucent area of the screen FIGURE 5. The geometrical centre of the screen 30 (FIGURE 5 and FIGURE 8) has been displaced together with the geometrical centre 30 of the subject (FIGURE 3) relative to the axis 36 (FIGURE 8) in accordance with the applied displacement factors as described previously.

Figure 9:
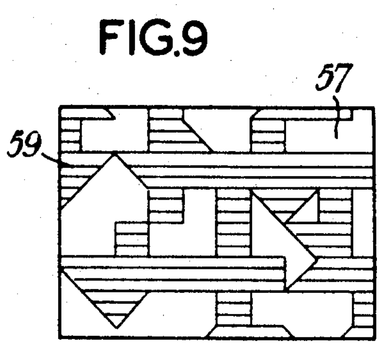

The procedure entailing two separate exposures onto the same film is referred to hereafter as "sequential projection," and the result of the sequential projection described with reference to FIGURE 8 is shown in FIGURE 9 which illustrates the configuration obtained after the film held in plateholder 24, FIGURE 1, has been developed. The exposed areas shown by horizontal or vertical lines in FIGURE 8 are shown by horizontal lines in FIGURE 9. The configuration shown in FIGURE 9 represents one of two coded representations of the subject, FIGURE 3, coded representations such as this being described hereafter as "file copy" as they can be filed or treated like ordinary matter without revealing the documentary subject's contents.

Figure 10:
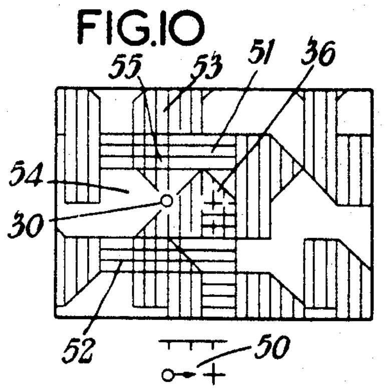

The second file copy is produced by a similar process, that is by the sequential projection of a subject as shown in FIGURE 3 and of a screen shown in FIGURE 6 onto a film held in plateholder 24 (FIGURE 1). Different displacement factors are applied when producing the second file copy indicated by the symbol 50 in FIGURE 10 denoting a displacement factor of minus 2 plus 90 degrees. The subject's image as it would appear if the film were developed after the first exposure is shown in FIGURE 10 in which the opaque areas 51 and 52 indicated by horizontal lines, correspond to the translucent areas 31 and 32 respectively in FIGURE 3. The area not containing horizontal lines in FIGURE 10 corresponds to the opaque area 33 in FIGURE 3. In accordance with the applied displacement factors the geometrical centre of the subject's image, FIGURE 3 and FIGURE 10, is displaced relative to the optical axis 36 (FIGURE 4 and FIGURE 10).

After the film held in plateholder 24 (FIGURE 1) has been exposed in the described manner the subject is removed from plateholder 22 (FIGURE 1) and a screen as shown in FIGURE 6 is inserted in the plateholder 20 (FIGURE 1). Without changing the displacement factors applied to the previous exposure a second exposure is made on the same film. The image of the screen, FIGURE 6, as it would appear if the film were developed is shown in FIGURE 10 in which the opaque areas indicated by vertical lines, correspond to the translucent areas of the screen in FIGURE 6, the opaque area 53 (FIGURE 10) for example corresponding to the translucent area 39 in FIGURE 6. The areas in FIGURE 10 not containing vertical lines correspond to the opaque areas of the screen, FIGURE 6, the area 54 (FIGURE 10) for example corresponding to the opaque area 40 in FIGURE 6. The areas shown by both horizontal and vertical lines in FIGURE 10 such as the one shown under 55 are those which have been exposed twice, first by a translucent area of the subject, FIGURE 3, and secondly by a translucent area of the screen, FIGURE 6. The geometrical centre of the screen 30 (FIGURE 6 and FIGURE 10) coincides with the geometrical centre of the subject's image 30 (FIGURE 3 and FIGURE 10) both having been displaced together relative to the axis 36 (FIGURE 10) in accordance with the applied displacement factors.

Figure 11:
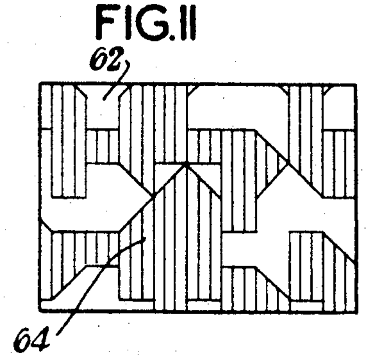

The result of the sequential projection described under FIGURE 10 is shown in FIGURE 11 which illustrates the configuration obtained after the film held in plateholder 24 (FIGURE 1) has been developed, the exposed areas shown by horizontal or vertical lines in FIGURE 10 being shown by vertical lines in FIGURE 11. The configuration shown in FIGURE 11 represents the second of the two coded representations or file copies of the documentary subject, FIGURE 3.

The file copies shown in FIGURE 9 and FIGURE 11 each contain a configuration resulting from a combination of two images, the image of a subject, FIGURE 3, and a screen, FIGURE 5, in the case of the file copy shown in FIGURE 9 and in the case of the file copy shown in FIGURE 11 the combination of the same subject's image and the image of a screen as shown in FIGURE 6. The two file copies are not complementary and one does not represent a negative or reversal of the other. Superimposing one file copy over the other in whatever position this may be attempted would not reveal the documentary subject, even if the relative positions of the two file copies superimposed one over the other should by chance correspond to the displacement factors applied in the production of these file copies.

The afore-described coding process can be summarised as follows:

The first of two coded representations or file copies of a documentary subject is produced by the sequential projection onto a film, first of a documentary subject and secondly of a screen, the same displacement factors being applied to both exposures. The second file copy is produced by the sequential projection onto another film, first of the documentary subject and secondly of a reversal of the first used screen, applying the same displacement factors to these two exposures, these displacement factors being preferably of a different order than those used for the production of the first file copy.

Figure 12:
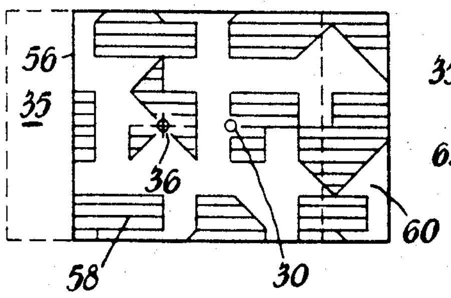

The decoding process is as follows:

The file copy (FIGURE 9) is placed in the plateholder 24 (FIGURE 1) and a film is placed in the plateholder 22 (FIGURE 1). The exposable area of the film held during the decoding process in plateholder 22 is shown in FIGURE 12 by the area 35 indicated by broken lines, this area corresponding to the exposable area of a film 35 (FIGURE 4) held in plateholder 24. If the file copy now held in plateholder 24 were projected in the described manner with the lens system 2 (FIGURE 1) and the mirror assembly 10, 11, 12 (FIGURE 1), in zero position, that is, with no displacement factors being applied, the area of the image 35 (FIGURE 4) projected onto the film held in plateholder 22 (FIGURE 1) would coincide with area 35 (FIGURE 12). The geometrical centre 36 of the file copy, FIGURE 8, and the geometrical centre of the area 35 (FIGURE 12) would coincide with the optical axis 36 (FIGURE 12). The point 30 (FIGURE 8) would appear in the position shown by point 30 in FIGURE 12. If, however, the displacement factors plus 3 plus 180 degrees, being those which were chosen when producing the file copy, FIGURE 8 and FIGURE 9, are applied again, the position of the file copy's projected image on the exposable film area 35 (FIGURE 12) is displaced and now appears in the position of the image 56 (FIGURE 12). The point 30 (FIGURE 8 and FIGURE 12) now coincides with the optical axis 36 (FIGURE 12) the image having also undergone a rotational displacement in accordance with the applied displacement factors. If the film held in plateholder 22 (FIGURE 1) having been exposed as described were developed, the pattern shown in FIGURE 12 would be obtained. The translucent areas in FIGURE 9 would appear as opaque areas shown by horizontal lines in FIGURE 12, the translucent area 57 (FIGURE 9) for example corresponding to the opaque area 58 (FIGURE 12). The opaque areas in FIGURE 9, would appear as translucent areas in FIGURE 12, the opaque area 59 (FIGURE 9) for example corresponding to the translucent area 60 in FIGURE 12.

Figure 13:
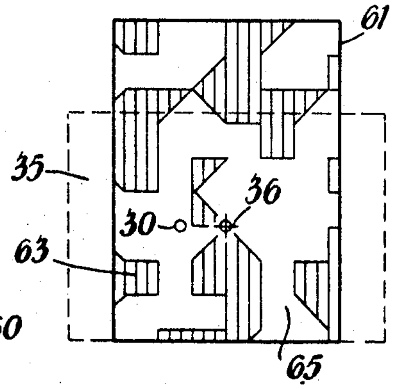

FIGURE 13 illustrates the decoding of the second file copy which is shown in FIGURE 11. The decoding process is as follows:

The file copy (FIGURE 11) is placed in the plateholder 24 (FIGURE 1) the film containing the latent image resulting from the previous exposure being retained in the plateholder 22 (FIGURE 1). The exposable area of the film held during the decoding process in plateholder 22 is shown in FIGURE 13 by the area 35 indicated by broken lines. If the file copy now held in plateholder 24 were projected in the described manner with the lens system 2 (FIGURE 1) and the mirror assembly 10, 11, 12 (FIGURE 1), in zero positon, that is with no displacement factors being applied, the area of the image projected onto the film held in plateholder 22 would coincide with the area 35 (FIGURE 13). The geometrical centre 36 of the file copy (FIGURE 10) and the geometrical centre of the area 35 (FIGURE 13) would coincide with the optical axis 36 (FIGURE 13). The point 30 (FIGURE 10) would appear in the position shown by point 30 in FIGURE 13. If, however, the displacement factors minus 3 plus 90 degrees, being those which were chosen when producing the file copy (FIGURES 10 and 11) are applied again, the position of the file copy's projected image on the exposible film area 35 (FIGURE 13) is displaced and now appears in the position of the image 61 (FIGURE 13). The point 30 (FIGURE 10 and FIGURE 13) now coincides with the optical axis 36 (FIGURE 13), the image having also undergone a rotational displacement in accordance with the applied displacement factors. If the film held in plateholder 22 (FIGURE 1) having been exposed as described and disregarding the latent image produced by the previous exposure, were developed, the pattern shown in FIGURE 13 would be obtained. The translucent areas in FIGURE 11 would appear as opaque areas shown by vertical lines in FIGURE 13 the translucent area 62 (FIGURE 11) for example corresponding to the opaque area 63 (FIGURE 13). The opaque areas in FIGURE 11 would appear as translucent areas in FIGURE 13, the opaque area 64 (FIGURE 11), for example, being shown in FIGURE 13 as translucent area 65.

Figure 14:
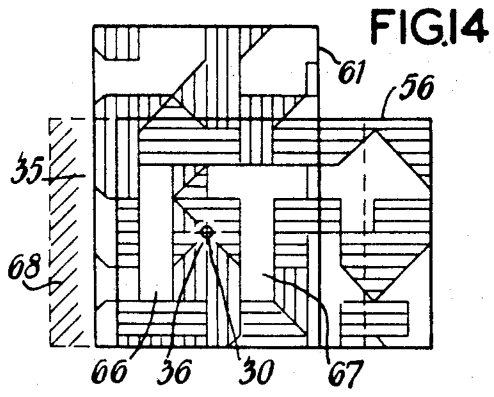

When the film held in plateholder 22 (FIGURE 1) has been exposed in the described manner twice, first to the file copy shown in FIGURE 9 and secondly to the file copy shown in FIGURE 11, the relative displacement factors having been applied for each exposure, the configuration shown in FIGURE 14 is obtained; the pattern 56 shown by horizontal lines in FIGURE 14 corresponds to the pattern 56 in FIGURE 12 and the pattern 61 shown by vertical lines in FIGURE 14 corresponds to the pattern 61 (FIGURE 13) The positions of both patterns relative to the optical axis 36 (FIGURE 14) corresponds to those shown in FIGURE 12 and FIGURE 13 respectively. The exposable area (35, FIGURES 12, 13, 14) of the film held in plateholder 22 (FIGURE 1) is indicated by broken lines in FIGURE 14. The geometrical centre 30 of each pattern, FIGURE 12 and FIGURE 13, coincides with the optical axis 36 (FIGURE 14).

Figure 15:
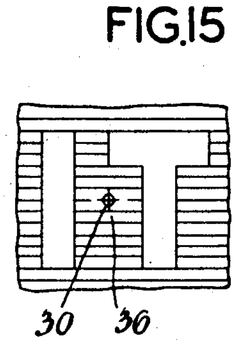

In the second exposure, the translucent, that is unexposed, areas of the pattern 56 (FIGURE 12 and FIGURE 14) have been exposed by the translucent areas of FIGURE 13. The areas 66 and 67 (FIGURE 14) are the only areas which were not exposed during either of the two exposures, whereas all other areas were exposed either during the first or during the second exposure. The areas 66 and 67 (FIGURE 14) correspond to the translucent areas of the subject 31 and 32 respectively in FIGURE 3 and their position relative to the optical axis 36 (FIGURE 14) corresponds to the one shown by point 30 in FIGURE 3. A suitable mask, a part of which is indicated under 68 (FIGURE 14) can be placed in front of the film held in plateholder 22 (FIGURE 1), the dimensions of this mask corresponding approximately to those of the subject shown in FIGURE 3, in which case the documentary subject will appear on the film held in plateholder 22 (FIGURE 1), as shown in FIGURE 15.

The described decoding process can now be summarised as follows:

Decoding is effected by the sequential projection onto a film, first of one of two file copies and then of the other, applying in each case the displacement factors chosen for the production of the respective file copies.

EXAMPLE 2

Figure 16:
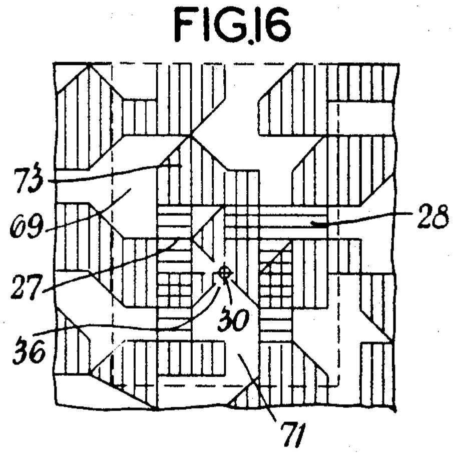

A screen as shown in FIGURE 5 is placed in the plateholder 20 (FIGURE 1) and a documentary subject as shown in FIGURE 2 is placed in the plateholder 22 (FIGURE 1). The combined image of a part of the screen and the subject is shown in FIGURE 16 in which the opaque areas of the screen FIGURE 5, are shown by vertical lines in FIGURE 16 the translucent areas of FIGURE 5 corresponding to the translucent areas shown in FIGURE 16. The opaque areas of the subject 27 and 28 in FIGURE 2 are shown by horizontal lines as area 27 and 28 respectively in FIGURE 16. The geometrical centre 30 of the subject and the screen, FIGURES 2, 5 and 16, coincide with the optical axis 36. The area within the dotted line 69 (FIGURE 16) corresponds to the exposable area of a film held in plateholder 24 (FIGURE 1).

Figure 17:
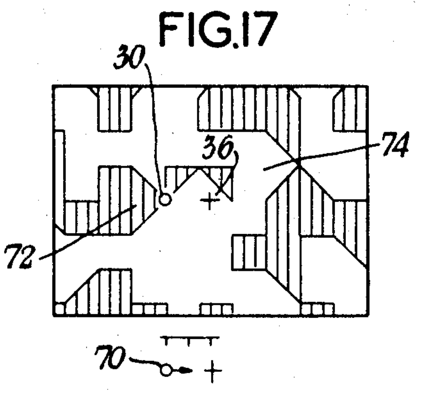

If the combined image shown in FIGURE 16 is projected onto a film held in plateholder 24 a file copy having the configuration shown in FIGURE 17 will be produced, the combined image of FIGURE 16 having been displaced in accordance with the displacement factors minus 2 plus 90 degrees as indicated by the symbol 70 (FIGURE 17). After developing the film the translucent areas of the image shown in FIGURE 16 appear as opaque areas in FIGURE 17 the translucent area 71 in FIGURE 16 for example corresponding to the opaque area 72 in FIGURE 17. The opaque areas in FIGURE 16 appear as translucent areas in FIGURE 17, the opaque area 73 in FIGURE 16 for example, corresponding to the translucent area 74 in FIGURE 17. The point 30 (FIGURE 16 and FIGURE 17) has been displaced relative to the optical axis 36 (FIGURE 16 and FIGURE 17) in accordance with the displacement factors applied.

The configuration shown in FIGURE 17 representing the first of two file copies was produced by the simultaneous projection of a subject such as shown in FIGURE 2 and a screen such as the one shown in FIGURE 5 and this procedure is referred to hereafter as "simultaneous projection." The configuration shown in FIGURE 17 is a reversal of the file copy shown in FIGURE 11 which latter was produced by the sequential projection of a reversed subject and a reversed screen.

Figure 18:
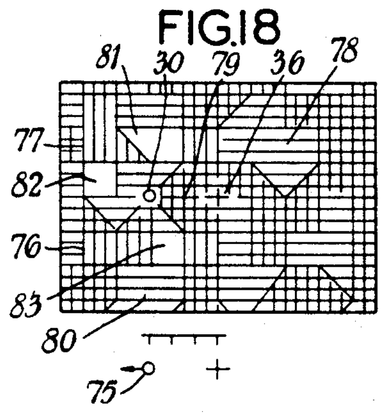

The second file copy is obtained by the sequential projection of the same two elements, that is, the subject shown in FIGURE 2 and the screen shown in FIGURE 5. FIGURE 18 illustrates the pattern obtained by the sequential projection after applying displacement factors of minus 3 plus 270 degrees as indicated by the symbol 75 (FIGURE 18).

Figure 19:
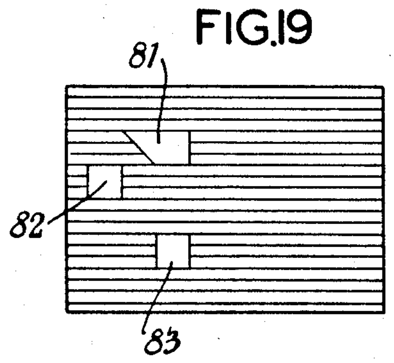

The pattern produced by projecting the subject FIGURE 2 onto a film held in plateholder 24 (FIGURE 1), if the film were developed at this stage, is shown in FIGURE 18, in which the opaque area 78 indicated by horizontal lines corresponds to the translucent area 28 (FIGURE 2). The areas not containing horizontal lines 76 and 77, FIGURE 18, correspond to the opaque areas 27 and 28 respectively in FIGURE 2. The image of the screen FIGURE 5 is shown in FIGURE 18 in which the opaque areas, indicated by vertical lines correspond to the translucent areas of the screen FIGURE 5, the opaque area 79 (FIGURE 18) for example, corresponding to the translucent area 38 in FIGURE 5. The areas in FIGURE 18 not containing vertical lines, correspond to the opaque areas in FIGURE 5, the area 80 (FIGURE 18), for example, corresponding to the opaque area 37 in FIGURE 5. The areas 81, 82, 83 (FIGURE 18) containing neither horizontal nor vertical lines are those where opaque areas of the subject, FIGURE 2, coincide with opaque areas of the screen, FIGURE 5. The geometrical centre 30 of both the subject, FIGURE 2, and the screen, FIGURE 5, is displaced relative to the optical axis 36, FIGURE 18, in accordance with the chosen displacement factor. The exposed areas shown in FIGURE 18 by horizontal or vertical lines are shown in FIGURE 19 by horizontal lines, FIGURE 19, representing the second of the two file copies produced according to this example.

The coding process in accordance with Example 2 can be summarised as follows:

The first of two file copies is produced by the simultaneous projection of a subject and a screen onto a film applying chosen displacement factors. The second file copy is obtained by the sequential projection of the same subject and the same screen onto a second film, preferably applying different displacement factors.

The decoding process according to Example 2 is as follows:

The file copy, FIGURE 17, is placed in the plateholder 24 (FIGURE 1) and a film is placed in the plateholder 22 (FIGURE 1). If the file copy now held in plateholder 24 were projected in the described manner onto the film, the displacement factors minus 2 plus 90 degrees, being those chosen for the production of the file copy, FIGURE 17, being applied, the projected image of the file copy, FIGURE 17, would be as shown in FIGURE 20. The opaque areas in FIGURE 17 are shown as opaque areas indicated by horizontal lines in FIGURE 20, the opaque area 72 (FIGURE 17), for example, corresponding to the opaque area 84 (FIGURE 20). The areas of the image FIGURE 17 not containing horizontal lines in FIGURE 20 correspond to the translucent areas in FIGURE 17. Part of the file copy's image falls outside the exposable area of the film held in plateholder 22.

The image of the file copy in FIGURE 17 is, however, not projected directly onto a film held in plateholder 22 (FIGURE 1), but onto a screen shown in FIGURE 5 which is inserted in the plateholder 20 (FIGURE 1) in front of the film held in plateholder 22 (FIGURE 1). The image of this screen is also shown in FIGURE 20, the opaque areas of the screen, FIGURE 5, corresponding to the opaque areas indicated by vertical lines in FIGURE 20. The areas within the exposable film area in FIGURE 20 not containing vertical lines correspond to the translucent areas of the screen, FIGURE 5. The point 30 in FIGURE 17 and FIGURE 20 having been displaced by the applied displacement factors now coincides with the geometrical centre 36 of the exposable film area in FIGURE 20. The geometrical centre of the screen, FIGURE 5, also coincides with the geometrical centre 36 of the exposable film area, FIGURE 20, which corresponds to the optical axis of the system.

The areas 86, 87, 88, 89 (FIGURE 20) are those where translucent areas of the file copy, FIGURE 17, coincide with translucent areas of the screen, FIGURE 5. When the film held in plateholder 22 (FIGURE 1) is exposed to the combined image shown in FIGURE 20 and developed, the result of this simultaneous projection is shown in FIGURE 21 where the translucent areas 86, 87, 88, 89 (FIGURE 20) appear as opaque areas 90, 91, 92, 93, respectively, indicated by vertical lines in FIGURE 21, the point 30 (FIGURES 20 and 21) again coinciding with the optical axis 36 (FIGURE 21).

The second step of the decoding process consists in removing the screen from plateholder 20, FIGURE 1, and the file copy, FIGURE 17, from plateholder 24 (FIGURE 1), retaining the once exposed film in plateholder 22 (FIGURE 1). The second file copy FIGURE 19, is now inserted into the plateholder 24 and projected onto the film held in plateholder 22 applying the same displacement factors minus 3 plus 270 degrees, being those chosen for the production of that file copy (FIGURE 18). The result of projecting the file copy, FIGURE 19, into the film in plateholder 22 is shown in FIGURE 21 where translucent areas 81, 82, 83 (FIGURE 19) appear as opaque areas 94, 95, 96, respectively, indicated by horizontal lines in FIGURE 21, the point 30 (FIGURES 18 and 21) coinciding with the optical axis 36 (FIGURE 21).

FIGURE 21 is a reconstitution of the original subject shown in FIGURE 2 and the decoding process according to this example can be summarised as follows:

Decoding is effected in two steps. The first consists of the simultaneous projection of the first file copy and the screen used in the production of this file copy applying the displacement factors chosen for the production of that file copy. The second step consists in the simple projection of the second file copy into the same film, applying the displacement factors chosen for the production of the second file copy.

Some of the inter-relating connections between the sequential and the simultaneous projection of elements and their reversals can be expressed as follows:

The simultaneous projection of two elements such as a subject and a screen produces a configuration which is the reversal of the configuration obtained from the sequential projection of the reversals of the same elements. Also: The simultaneous projection of a reversed subject and a screen produces a configuration which is a reversal of the configuration obtained from the sequential projection of the original subject and the reversed screen. For example, the file copy shown in FIGURE 9 can also be obtained by reversing the pattern obtained from a simultaneous projection of the subject FIGURE 2 and the reversed screen FIGURE 6. If a type of photographic material commonly known as reversal material is used, or if a different developing process is applied, the separate step of making a reversal from a previously exposed film is obviated. It will thus be appreciated that the file copies may be produced by a variety of combinations of sequential and simultaneous exposures.

The foregoing Example 1 requires the knowledge of the respective displacement factors for successful decoding. In Example 1, two displacement factors are applied to each of two file copies and this may be regarded as equivalent to four decoding "keys." Example 2 requires in addition the presence of a screen for successful decoding, and accordingly, this example can be regarded as entailing five decoding keys. Yet another example requiring additional decoding keys will now be described.

EXAMPLE 3

The first coding step according to this example consists in the simultaneous projection of a subject shown in FIGURE 2 and a screen shown in FIGURE 5 onto a film held in plateholder 24 (FIGURE 1) producing the file copy shown in FIGURE 17. This configuration is reproduced in FIGURE 22 where the opaque areas in FIGURE 17 are shown also as opaque areas indicated by vertical lines in FIGURE 22. The same displacement factors, minus 2 plus 90 degrees, were applied as indicated by the symbol 70 (FIGURES 17 and 22). The second step of the coding process consists in the simultaneous projection of the reversed subject, shown in FIGURE 3, and the reversed screen, shown in FIGURE 6, onto the same film, the combined image corresponding to the pattern shown in FIGURE 18 and FIGURE 19. The displacement factors applied to the second exposure are the same as those chosen for the first exposure, that is, minus 2 plus 90 degrees. The result of the second exposure is shown in FIGURE 22 where the opaque areas 97, 98, 99, indicated by horizontal lines in FIGURE 22, correspond to the translucent areas 81, 82, 83 respectively, of the pattern shown in FIGURES 18 and 19. The point 30 (FIGURES 17 and 22) coinciding with the point 30 of the pattern shown in FIGURES 18 and 19 is displaced in accordance with the applied displacement factors relative to the optical axis 36 (FIGURE 22) which latter coincides with the geometrical centre of the film held in plateholder 24 (FIGURE 1). The translucent areas in FIGURE 22 are those which have not been exposed by either of the simultaneous projections.

FIGURE 22 represents the first of two file copies produced in accordance with this method. The second file copy is a reversal of the first and is illustrated in FIGURE 23 where the opaque areas of FIGURE 22 correspond to the translucent areas in FIGURE 23, the opaque area 72 in FIGURE 22, for example, corresponding to the translucent area 100 in FIGURE 23. The translucent areas of FIGURE 22 appear as opaque areas indicated by horizontal lines in FIGURE 23, the translucent area 74 (FIGURE 22), for example, corresponding to the opaque area 101 in FIGURE 23. As the second file copy FIGURE 23 is a reversal of the first file copy FIGURE 22, the same displacement factors apply.

The coding method just described can be summarized as follows:

The first of two file copies is produced in two steps, the first consisting of the simultaneous projection of a documentary subject and a screen onto a film, the second step consisting in the simultaneous projection of the reversed subject and the reversed screen onto the same film, the same displacement factors being applied throughout. This can be defined as the sequential exposure of a film to two simultaneous projections. The second file copy consists of a reversal of the first file copy.

The second file copy shown can also be produced in a different manner:

A simultaneous projection of the subject, FIGURE 2, and the reversed screen, FIGURE 6, produces an image as shown in FIGURES 8 and 9. Applying the displacement factors plus 3 plus 180 degrees as indicated by the symbol 102 in FIGURE 24 a film held in plateholder 24 (FIGURE 1) would, having been exposed to the image shown in FIGURE 9 and developed, contain the pattern shown in FIGURE 24 where the translucent areas in FIGURE 9 appear as opaque areas indicated by vertical lines in FIGURE 24, the translucent area 57 (FIGURE 9), for example, corresponding to the opaque area 103 (FIGURE 24). The opaque areas in FIGURE 9 correspond to the translucent areas in FIGURE 24, the opaque area 59 (FIGURE 9), for example, corresponding to the translucent area 104 in FIGURE 24.

The second step in producing the second file copy consists in the simultaneous projection of the reversed subject, FIGURE 3, and the screen, FIGURE 5, onto the same film held in plateholder 24 (FIGURE 1), the combined image corresponding to the pattern shown in FIGURE 20. Translucent areas 86, 87, 88, 89, in FIGURE 20, will appear after applying the same displacement factors 102 (FIGURE 24) on the exposed and developed film as the opaque areas 105, 106, 107, 108, respectively, indicated by horizontal lines in FIGURE 24. The point 30 (FIGURES 8 and 20) corresponding to the point 30 (FIGURE 24) is displaced in accordance with the applied displacement factors relative to the optical axis 36 (FIGURE 24) which latter coincides with the geometrical centre of the film held in plateholder 24 (FIGURE 1). The translucent areas in FIGURE 24 are those which have not been exposed by either of the simultaneous projections. A comparison of the second version of the second file copy shown in FIGURE 24 with the first version of the second file copy shown in FIGURE 23 shows that the two are identical within their common area as shown for example by the congruence of one of the opaque areas 109 in FIGURE 24 and 110 in FIGURE 23 differing only in their position relative to the geometrical centre of the film area.

The previous summary of this coding method can be modified as follows:

The second of two file copies can also be produced by, first, the simultaneous projection of a subject and a reversed screen and, secondly, by the simultaneous projection of a reversed subject and a screen applying the same displacement factors to both exposures, these displacement factors being preferably of a different order than those chosen when producing the first file copy.

The decoding proces according to Example 3 is as follows:

The first step of the decoding process consists in inserting the file copy FIGURE 22 in the plateholder 24 (FIGURE 1) and the screen FIGURE 5 in the plateholder 20 (FIGURE 1). When the displacement factors chosen for the production of the file copy FIGURE 22, minus 2 plus 90 degrees, are applied, the combined image of the file copy and the screen projected in the described manner onto a film held in plateholder 22 (FIGURE 1) is as shown in FIGURE 25. The opaque areas in FIGURE 22 correspond to the opaque areas indicated by horizontal lines in FIGURE 25 as shown, for example, by one of the opaque areas 72 (FIGURES 22 and 25). The point 30 (FIGURES 22 and 25) coincides with the point 36 (FIGURE 25) which latter represents the geometrical centre of the exposable area of the film held in plateholder 22 (FIGURE 1). The areas not containing horizontal lines in FIGURE 25 correspond to the translucent areas of FIGURE 22 within the image 111 in FIGURE 25. Part of this image falls outside the exposable area of the film held in plateholder 22 (FIGURE 1). The opaque areas of the screen, FIGURE 5, correspond to the opaque areas indicated by vertical lines in FIGURE 25, the areas not containing vertical lines in FIGURE 25 corresponding to the translucent areas of the screen, FIGURE 5. The centre of the screen 30 (FIGURE 5) coincides with the optical axis and the centre of the exposable film area 36 (FIGURE 25). If the film held in plateholder 22 (FIGURE 1), after being exposed to the image, FIGURE 25, were developed a configuration as shown in FIGURE 21 would be obtained in which the opaque areas 90, 91, 92, 93, shown by vertical lines in FIGURE 21 correspond to the translucent areas 112, 113, 114, 115, respectively in FIGURE 25.

The second step in the decoding process consists in removing the file copy, FIGURE 22, from the plateholder 24 (FIGURE 1) and replacing it by the second file copy, the second version of which as illustrated in FIGURE 24 is chosen for this example. The screen FIGURE 5 held in plateholder 20 (FIGURE 1) is replacing by the reversed screen, FIGURE 6, the once exposed film being retained in plateholder 22 (FIGURE 1). When the displacement factors chosen for the production of the file copy, FIGURE 24, plus 3 plus 180 degrees, are applied, the combined image of the file copy and the screen projected in the described manner onto the film held in plateholder 24 (FIGURE 1) is as shown in FIGURE 26. The opaque areas are indicated by horizontal lines in FIGURE 26 as shown, for example, by one of the opaque areas 116 (FIGURES 24 and 26). The point 30 (FIGURES 24 and 26) coincides with the point 36 (FIGURE 26) which latter represents the geometrical centre of the exposable area of the film held in plateholder 22 (FIGURE 1). The translucent areas in FIGURE 24 correspond to the areas not containing horizontal lines within the image 117 in FIGURE 26. Part of this image falls outside the exposable area of the film held in plateholder 22 (FIGURE 1). The opaque areas of the screen, FIGURE 6, correspond to the opaque areas in FIGURE 26 indicated by vertical lines, the areas not containing vertical lines in FIGURE 26 corresponding to the translucent areas of the screen, FIGURE 6. The centre of the screen 30 (FIGURE 6) coincides with the optical axis and the centre of the exposable film area 36 (FIGURE 26). If the film held in pateholder 22 (FIGURE 1), after being exposed to the image, FIGURE 26, and disregarding the first exposure were developed, a pattern would result as shown in FIGURE 21 in which the opaque areas 94, 95, 96, shown by horizontal lines in FIGURE 21 correspond to the translucent areas 118, 119, 120 respectively in FIGURE 26.

The sequential exposure of the film in plateholder 22 (FIGURE 1) to the two simultaneous projections described results in a reconstitution of the original subject as shown in FIGURE 21 and the decoding process according to Example 3 can be summarised as follows:

Decoding is effected in two steps. The first consists of the simultaneous projection of the first file copy and a screen onto a film applying the displacement factors chosen for the production of the first file copy. The second step consists in the simultaneous projection on to the same film of the second file copy and a reversal of the first used screen, applying the displacement factors chosen for the production of the second file copy. This process can be described also as the sequential exposure of a film to two simultaneous projections, the first consisting of the first file copy and a screen, the second of the second file copy and the reversed screen, applying the displacement factors chosen for the production of the respective file copies.

In this example, six decoding keys are used which are: the two displacement factors applied to the production of a first file copy, a screen, the two displacement factors applied to the production of the second file copy and the reversed screen. The coding process according to this example requires two exposures for each of the two file copies. The decoding process requires two exposures to be made.

EXAMPLE 4

Figure 27:
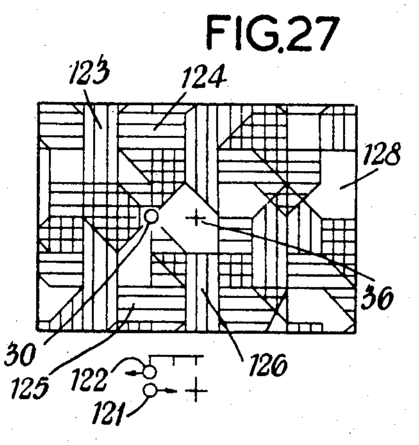
Figure 28:
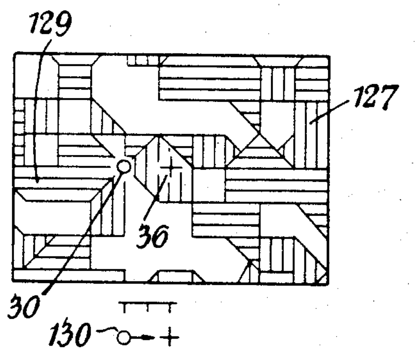

In this example, the coding process consists of two sequences each being a combination of simultaneous and sequential projections. The first step consists in inserting a reversed screen as shown in FIGURE 6 into the plateholder 20 (FIGURE 1) and a chosen pattern, such as for example, a screen as shown in FIGURE 5, into the plateholder 22 (FIGURE 1). The latter screen is, however, rotated by 180 degrees around its geometrical centre prior to insertion so that the lower edge of the configuration shown in FIGURE 5 is now adjacent to the top of the frame holder 22 (FIGURE 1). FIGURE 27 shows the combined image resulting from these two elements after displacement factors of minus 2 plus 180 degrees have been applied. This is shown by the symbol 121 which in this case applies only to the position of the image of the reversed screen, FIGURE 6, which is inserted in the plateholder 20 (FIGURE 1). The symbol 122 (FIGURE 27) indicates the position of the projected image of the screen, FIGURE 5, which is inserted in plateholder 22 (FIGURE 1) and which, as described, is displaced from its normal position by rotation of 180 degrees. The opaque areas shown by vertical lines in FIGURE 27 correspond to the opaque areas in FIGURE 6, the opaque area 123 (FIGURE 27) for example, corresponding to the opaque area 40 (FIGURE 6). The areas not containing vertical lines in FIGURE 27 correspond to the translucent areas of FIGURE 6, the area 124 (FIGURE 27) for example corresponding to the translucent area 39 (FIGURE 6). The areas containing horizontal lines in FIGURE 27 correspond to the opaque areas of the screen, FIGURE 5, the opaque area 125 (FIGURE 27), for example, corresponding to the opaque area 37 (FIGURE 5). The areas not containing horizontal lines in FIGURE 27 correspond to the translucent areas in FIGURE 5, the area 126 (FIGURE 27) for example, corresponding to the translucent area 38 (FIGURE 5). The point 30 representing the geometrical centre of the screens shown in FIGURES 5 and 6 is displaced relative to the point 36 representing the centre of the exposable area of a film held in plateholder 24 (FIGURE 1) coinciding with the optical axis. If a film held in plateholder 24 were exposed to the combined image as shown in FIGURE 27 and if the film were developed at this stage a configuration would be obtained as shown in FIGURE 28 in which the opaque areas indicated by vertical lines correspond to the translucent areas in FIGURE 27, the opaque area 127 (FIGURE 28) for example, corresponding to the translucent area 128 (FIGURE 27). The areas not containing vertical lines in FIGURE 28 correspond to the opaque areas of the combined image shown in FIGURE 27.

Figure 29:
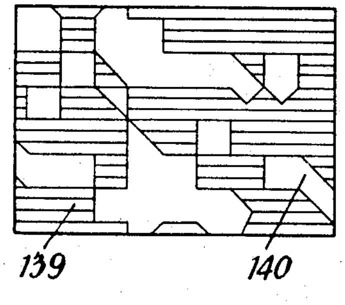

After removing both screens from the plateholders 22 and 20 (FIGURE 1) respectively, the subject, FIGURE 2, is inserted in the plateholder 22 and the screen, FIGURE 5, is inserted in the plateholder 20, the once exposed film being retained in plateholder 24 (FIGURE 1). The simultaneous projection of the subject, FIGURE 2, and the screen, FIGURE 5, produces the configuration shown in FIGURE 17 (representing one of two file copies according to the example described under FIGURE 17). The pattern produced by this simultaneous projection is shown by the opaque areas containing horizontal lines in FIGURE 28, the opaque area 129 (FIGURE 28) for example, corresponding to the opaque area 72 (FIGURE 17). The areas not containing horizontal lines in FIGURE 28 correspond to the translucent areas in FIGURE 17. The symbol 130, FIGURE 28, indicates that the displacement factors minus 2 plus 90 degrees are the same as those applied to the first exposure, the point 30 (FIGURE 28) having the same displacement relative to the point 36 (FIGURE 28). FIGURE 29 shows the configuration obtained when the film held in plateholder 24 (FIGURE 1) has been developed after the two exposures have been made, the opaque areas of the pattern in FIGURE 28 being shown as opaque areas containing horizontal lines in FIGURE 29. The configuration shown in FIGURE 29 represents the first of two file copies produced according to this example.

Figure 30:
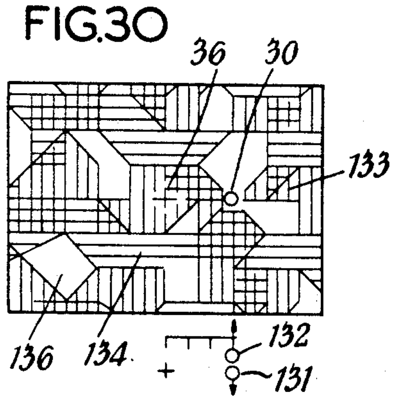
Figure 31:
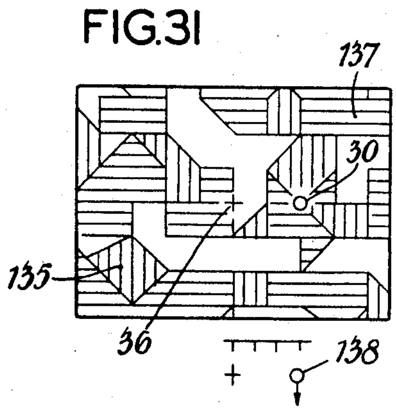

The second file copy is produced in similar manner. The screen, FIGURE 5, is inserted into the plateholder 20, FIGURE 1, and a chosen pattern, such as for example, the reversed screen, FIGURE 6, is inserted, after rotation of 180 degrees, into the plateholder 22 (FIGURE 1). The displacement factors applied in this case are plus 3 plus 180 degrees as shown by symbol 131 in FIGURE 30 which denotes the position of the projected image of the screen, FIGURE 5, the symbol 132 denoting the position of the projected image of the screen, FIGURE 6, held in plateholder 22, FIGURE 1, which is displaced by 180 degrees relative to the former. FIGURE 30 illustrates the combined image resulting from this simultaneous projection. The opaque areas containing vertical lines in FIGURE 30 correspond to the opaque areas of the screen, FIGURE 5, the area 133 (FIGURE 30) for example corresponding to part of the opaque area 37 (FIGURE 5). The areas not containing horizontal lines in FIGURE 30 correspond to the translucent areas in FIGURE 5. The opaque areas containing horizontal lines in FIGURE 30 correspond to the opaque areas of the reversed screen, FIGURE 6, the area 134 (FIGURE 30) for example, corresponding to the opaque area 40 (FIGURE 6). The point 30 (FIGURE 30) representing the geometrical centre of the screens, FIGURE 5 and FIGURE 6, respectively is displaced in accordance with the applied displacement factors relative to the point 36 representing the centre of the exposable area of a film held in plateholder 24 (FIGURE 1) coinciding with the optical axis. Projecting the combined image of the screen, FIGURE 5, held in plateholder 20 (FIGURE 1) and of the reversed screen, FIGURE 6, held in plateholder 22 (FIGURE 1) onto a film held in plateholder 24 (FIGURE 1) would, if the film were developed at this stage, produce a pattern as shown in FIGURE 31 in which the areas containing vertical lines correspond to the translucent areas of the pattern shown in FIGURE 30, the area 135 (FIGURE 31) for example, corresponding to the translucent area 136 (FIGURE 30). The areas not containing horizontal lines in FIGURE 31 correspond to the opaque areas of the pattern shown in FIGURE 30.

Figure 32:
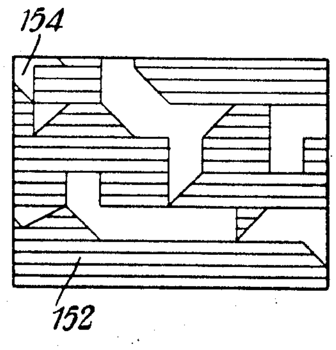

After removing both screens from the plateholders 22 and 20, respectively, but retaining the once exposed film in plateholder 24 (FIGURE 1) the subject, FIGURE 2, is inserted in the plateholder 22 and the reversed screen, FIGURE 6, is inserted in the plateholder 20. The simultaneous projection of the subject, FIGURE 2, and the reversed screen, FIGURE 6, produces a configuration which is a reversal of the one shown in FIGURE 9 (representing one of two file copies according to the first described example). The pattern produced by this simultaneous projection is shown in FIGURE 31 in which the opaque areas containing horizontal lines correspond to the translucent areas in FIGURE 9, the opaque area 137 (FIGURE 31), for example, corresponding to the translucent area 57 in FIGURE 9. The areas not containing horizontal lines in FIGURE 31 correspond to the opaque areas in FIGURE 9. The symbol 138 (FIGURE 31) indicates that the displacement factors plus 3 plus 180 degrees are the same as those applied to the first exposure, the point 30 (FIGURE 31) having the same displacement relative to the point 36 (FIGURE 31). FIGURE 32 shows the configuration obtained when the film held in plateholder 24 has been developed after the two exposures have been made, the opaque areas of the pattern in FIGURE 31 being shown as opaque areas containing horizontal lines in FIGURE 32. The configuration shown in FIGURE 32 represents the second of two file copies produced according to this example.

The coding process according to Example 4 can be summarized as follows:

The first of two file copies is produced in two steps, the first consisting of the simultaneous projection of a reversed screen and a screen, the latter being displaced relative to the former, the second step consisting of a simultaneous projection onto the same film of a subject and the screen, the same displacement factors being applied to both exposures. The second file copy is likewise produced in two steps, the first consisting of the simultaneous projection of a screen and its reversal, the latter being displaced relative to the former, the second step consisting of the simultaneous projection onto the same film of a subject and a reversed screen, the same displacement factors being applied to these two exposures, these displacement factors being preferably of a different order than those used for the production of the first file copy. The production of each of the two file copies can be defined as a sequential exposure of a film to two simultaneous projections.

The decoding process according to Example 4 is as follows:

The first step of the decoding process consists in inserting the file copy, FIGURE 29, in the plateholder 24 (FIGURE 1) and the screen, FIGURE 5, in the plateholder 20 (FIGURE 1). When the displacement factors chosen for the production of the file copy, FIGURE 29, minus 2 plus 90 degrees, are applied the combined image of the file copy and the screen projected in the described manner onto a film held in plateholder 22 (FIGURE 1) is as shown in FIGURE 33. The opaque areas of FIGURE 29 correspond to the opaque areas indicated by horizontal lines in FIGURE 33 as shown by one of the opaque areas 139 in FIGURE 29 and FIGURE 33. The areas not containing horizontal lines in FIGURE 33 correspond to the translucent areas in FIGURE 29 as shown, for example,. by the area 140, FIGURE 29 and FIGURE 33. The point 30 (FIGURES 28 and 33) coincides with the point 36 (FIGURE 33) which latter represents the geometrical centre of the exposable area of the film held in plateholder 24 (FIGURE 1) coinciding with the optical axis. Part of the image produced by the file copy, FIGURE 29, falls outside the exposable film area. The opaque areas of the screen, FIGURE 5, correspond to the opaque areas containing vertical lines in FIGURE 33, the area 141 (FIGURE 33), for example, corresponding to the opaque area 37 of the screen, FIGURE 5. The areas not containing vertical lines in FIGURE 33 correspond to the translucent areas of the screen, FIGURE 5, the area 142 (FIGURE 33), for example, corresponding to the translucent area 38 of the screen, FIGURE 5. The geometrical centre 30 of the screen, FIGURE 5, coincides with the point 36 representing the geometrical centre of the exposable area of the film held in plateholder 22, FIGURE 1. Part of the image of the file copy, FIGURE 29, falls outside the exposable film area. If the film held in plateholder 22 (FIGURE 1), after being exposed to the image, FIGURE 33, were developed at this stage a configuration as shown in FIGURE 35 would be obtained in which the translucent areas 143, 144, 145 and 146 (FIGURE 33) would appear as opaque areas 147, 148, 149 and 150 respectively, indicated by horizontal lines in FIGURE 35.

The second step in the decoding process consists in removing the file copy, FIGURE 29, from the plateholder 24 (FIGURE 1) and replacing it by the second file copy, FIGURE 32. The screen, FIGURE 5, is removed from the plateholder 20 (FIGURE 1) and replaced by the reversed screen, FIGURE 6, the once exposed film being retained in plateholder 22 (FIGURE 1). When the displacement factors chosen for the production of the file copy, FIGURE 32, plus 3 plus 180 degrees, are applied, the combined image of the file copy and the screen projected in the described manner onto the film held in plateholder 22 is as shown in FIGURE 34. The opaque areas of the file copy, FIGURE 32, are shown in FIGURE 34 by the opaque areas containing horizontal lines, the area 151 (FIGURE 34), for example, corresponding to the opaque area 152 (FIGURE 32). The areas not containing horizontal lines in FIGURE 34 correspond to the translucent areas of FIGURE 32, the area 153 (FIGURE 34), for example, corresponding to the translucent area 154 in FIGURE 32. The point 30 (FIGURES 31 and 34) coincides with the point 36 which represents the geometrical centre of the exposable area of the film held in plateholder 22 coinciding with the optical axis. Part of the image of the file copy, FIGURE 32, falls outside the exposable film area. The opaque areas indicated by vertical lines in FIGURE 34, correspond to the opaque areas of the screen, FIGURE 6, the area 154 (FIGURE 34) for example, corresponding to the opaque area 40 of the screen, FIGURE 6. The areas not containing vertical lines in FIGURE 34 correspond to the translucent areas of the screen, FIGURE 6, the area 155 (FIGURE 34) for example, corresponding to the translucent area 39 of the screen, FIGURE 6. The geometrical centre 30 of the screen, FIGURE 6, coincides with the geometrical centre 36 of the exposable film area. If the film held in plateholder 22 after being exposed to the image, FIGURE 34, were developed at this stage, and disregarding the first exposure, a pattern would result as shown in FIGURE 35 where the translucent areas 156, 157, 158 in FIGURE 34 correspond to the opaque areas 159, 160, 161, respectively, indicated by vertical lines in FIGURE 35. FIGURE 35 showing the result of the two exposures is a reconstitution of the original subject, FIGURE 2. The decoding procedure is the same as the two step procedure applied to the last described method consisting of the sequential exposure of a film to two simultaneous projections. The coding process according to this method requires two exposures for each of two file copies, and the decoding procedure requires two exposures. The method entails six decoding keys, two displacement factors for each of the two file copies and two screens.

EXAMPLE 5

A documentary subject as shown in FIGURE 3 is inserted in the plateholder 22 (FIGURE 1) and a film is inserted in the plateholder 24 (FIGURE 1), no screen being required. The production of a file copy is effected by a number of exposures of the film held in plateholder 24 to the image of the subject held in plateholder 22 different displacement factors being applied to each exposure. FIGURE 36 illustrates this process and shows the configuration obtained by three projections of the same subject applying different displacement factors to each exposure. The areas 162 and 163 (FIGURE 36) correspond to the areas 31 and 32 respectively in FIGURE 3 after applying a displacement factor of minus 4 units plus 180 degrees as indicated by the symbol 164 (FIGURE 36). The position of the subject's image for the second exposure is indicated by broken lines in FIGURE 36, the areas 165 and 166 (FIGURE 36) corresponding to the areas 31 and 32 (FIGURE 3) after a displacement factor of plus 2 units plus 90 degrees has been applied as indicated by the symbol 167. The position of the subject's image projected onto the film held in plateholder 24 for the third exposure is shown by the areas 168 and 169 indicated by horizontal lines in FIGURE 36 corresponding to the areas 31 and 32 (FIGURE 3), the displacement factors for the third exposure being indicated by the symbol 170 as plus 5 units zero degrees. The points 30A, 30B, 30C, representing in each case the geometrical centre of the subject in plateholder 22 (FIGURE 1), are displaced relative to the point 36 representing the geometrical centre of the exposable area of the film held in plateholder 24 coinciding with the optical axis, the respective displacements being in accordance with the displacement factors applied to each exposure. Whilst a larger number of exposures can be applied the present example shows the result of a triple exposure in FIGURE 37 where the opaque area indicated by horizontal lines corresponds to the areas exposed by the previously described three exposures illustrated in FIGURE 36. FIGURE 37 represents the file copy produced according to the present example.

The decoding process according to Example 5 is as follows:

The file copy, FIGURE 37, is inserted in the plateholder 24 (FIGURE 1) and the displacement factors minus 4 units plus 180 degrees, being those chosen for the first exposure, are applied. A film held in plateholder 22 (FIGURE 1) is exposed to this image and if the film were developed at this stage a pattern would be obtained as shown in FIGURE 38 where the translucent areas of FIGURE 37 appear as opaque areas containing horizontal lines in FIGURE 38. The areas in FIGURE 38 not containing horizontal lines correspond to the opaque areas in FIGURE 37. The point 30A (FIGURES 36 and 38) coincides with the point 36 (FIGURE 38) representing the geometrical centre of the exposable area 171 (FIGURE 38) of the film held in plateholder 22 (FIGURE 1), coinciding with the optical axis. Part of the projected image falls outside the exposable film area 171 (FIGURE 38). The second step consists in applying the displacement factors chosen for the second exposure of the coding process, plus 2 units plus 90 degrees, for the second decoding exposure. The pattern produced by the second decoding exposure on the film held in plateholder 22 (FIGURE 1) is shown in FIGURE 38 by vertical lines, the image area shown surrounded by a broken line. The areas containing vertical lines in FIGURE 38 correspond to the translucent areas in FIGURE 37 and the areas not containing vertical lines in FIGURE 38 correspond to the opaque areas in FIGURE 37. The point 30B (FIGURES 36 and 38) coincides with the point 36 (FIGURE 38). Part of the projected image falls outside the exposable film area 171 (FIGURE 38). If the film held in plateholder 22 (FIGURE 1) were developed after the two decoding exposures are made the pattern as shown in FIGURE 38 would be obtained which is repeated in FIGURE 39 where the opaque areas in FIGURE 38 are shown as opaque areas containing horizontal lines in FIGURE 39. The areas not containing horizontal lines in FIGURE 39 correspond to the translucent areas in FIGURE 38, the translucent area 172 in FIGURE 38, for example, corresponding to the translucent area 173 in FIGURE 39. The third step in the decoding procedure consists in applying the displacement factors plus 5 units zero degrees, being those chosen for the third coding exposure. The pattern obtained by the third exposure is shown in FIGURE 39 where the opaque areas containing vertical lines correspond to the translucent areas of FIGURE 37 and the areas not containing vertical lines in FIGURE 39 correspond to the opaque areas in FIGURE 37. The point 30C together with the points 30A and 30B coincides with the point 36 representing the centre of the exposable film area. A suitable mask, part of which is shown under 174 (FIGURE 39), can be inserted in front of the film held in plateholder 22 (FIGURE 1) which, when developed after three decoding exposures have been made, contains a reconstitution of the original subject in reversed form corresponding to the subject shown in FIGURE 3.

A comparison of FIGURE 38 and FIGURE 39 shows that in this example the third and last decoding exposure has not added material pattern elements to the configuration shown in FIGURE 38 and could, therefore, have been omitted. This is the case when decoding exposures are carried out in the same sequence in which the coding exposures were made.

The coding and decoding procedure according to the method of Example 5 can be summarised as follows:

A file copy is produced by a number of exposures of a subject onto the same film applying different displacement factors to each exposure. Decoding is effected by making the same numbers of exposures of the file copy onto a film applying the same displacement factors that were chosen for the coding processes. The sequence of decoding exposures need not follow the sequence of the coding exposures.

The process employed in Example 5 in producing the file copy shown in FIGURE 37 can also be employed in producing a screen performing the same function as the one shown in FIGURE 5. It is generally advantageous to use a type of screen pattern, the character of which is related to the type of documentary subject that is to be coded. If the latter consists, for example, of typescript, then one convenient method of producing a screen suitable for that subject consists in the procedure described for the production of the file copy shown in FIGURE 37. It is preferable not to use the actual documentary subject for the production of a screen by multiple exposure, but rather a typescript similar to the one of the subject, but with different content.

The foregoing examples illustrate the production of the file copies shown in FIGURES 9 and 11, 17 and 19, 22 and 24, 28 and 32 and 37. Though in the examples illustrated the respective file copies present on adequate disguise of the original subject the coding process can be extended into, what might be called, a second phase. A file copy can be regarded as an original subject and coded again in accordance with any of the coding methods described, thereby producing a coded version of a file copy. In this event, decoding is effected also in two phases, the first phase consisting in decoding the coded version of the file copy by the appropriate method and, after the file copy has been reconstituted, in proceeding with the second phase of the decoding operation by applying the decoding method appropriate to the method employed in producing the file copy.

The foregoing examples are based on displacing an image or combination of images relative to a film. The apparatus described with reference to FIGURE 1 effects this displacement by optical means, that is, by movement of the mirror assembly 10, 11, 12, and/or the lens system 2. The required displacement of an image or a combination of images relative to a film can also be brought about by other means, such as, for example, the following:

The lens system 2 (FIGURE 1) or its equivalent is mounted in a fixed position and the plate holder 20 (FIGURE 1) holding a screen, is one is used, is moved measurably in unison with the plateholder 22 (FIGURE 1) holding a documentary subject. The mirror assembly 10, 11, 12 (FIGURE 1) can be omitted. Another arrangement can function, for example, by retaining the plateholder 20 and the plateholder 22 as well as the lens system 2 in a fixed position and (optionally omitting the mirror assembly 10, 11, 12, FIGURE 1), by adjusting measurably the position of the plateholder 24 (FIGURE 1) which holds a film. It is also possible to arrange for the plateholder holding the screen to be mounted in a fixed or measurably adjustable position in front of and adjacent to the plateholder 24 (FIGURE 1) holding the film which is to be exposed. In this case, the number of possible decoding keys would be reduced as the same displacement factors would be applied to both file copies, whenever these are produced in pairs. The principles of the described method remain applicable if arrangements such as these were employed although the particular configurations obtained during the various processes would be different.

The function of the apparatus described can be extended to include more than one screen used in the coding and decoding of a documentary subject. An additional screen can be inserted in a further plateholder to be positioned, for example, adjacent to the plateholder 20 (FIGURE 1) or in an equivalent position in the case of a different arrangement, the position of this additional plateholder being measurably adjustable. An additional screen interposed in this manner would be equivalent to operating the apparatus with "variable" screen patterns, thereby adding to the number of decoding keys applicable to the respective coding and decoding methods employed. Another extension of the function of the apparatus would consist in employing more than one mirror assembly 10, 11, 12 (FIGURE 1), the position of each of these being measurably adjustable. Similarly, the position of the mirror 23 (FIGURE 1) or of other reflecting mirrors, if used, can be arranged to be measurably adjustable, thereby increasing the number of decoding keys applicable to the respective coding and decoding method employed.

Whilst in the apparatus described under FIGURE 1 the plateholders 20 and 22 are at the front of the housing 1 and at right angles to the plateholder 24 mounted on the upper side of the housing 1, another arrangement would consist in mounting the plateholders 20 and 22 (FIGURE 1) on the upper side of the housing 1. This entails placing a mirror similar to the mirror 23 (FIGURE 1), in a plane at right angles to the latter, in front of the mirror assembly 10, 11, 12 (FIGURE 1) the geometrical centre of this mirror coinciding with the optical axis 13 (FIGURE 1).

It is important that a file copy, inserted in plateholder 24 (FIGURE 1) prior to decoding, is correctly positioned realtive to the optical axis 13 (FIGURE 1), that is in the same position in which the film was exposed during the coding process. To facilitate this one or more location marks such as, for example, suitable diffraction patterns can be fixed to the housing 1 acting as "masks" in front of the film held in plateholder 24. These location marks, preferably disposed in one or more corners or along one edge of the exposable film area can be transferred onto the film by a separate exposure prior to commencing the coding process, the thus exposed film areas being subsequently shielded to prevent further exposure during the coding process. The position of the file copy, when inserted in plateholder 24 for decoding, can be adjusted by means of the mechanism 25 (FIGURE 1), the adjustment being effected by bringing the location marks on the file copy into coincidence with those of the "mask."

Assuming that the mechanical components of the apparatus are of the required precision it is possible to carry out the coding of a documentary subject on one apparatus and to effect the decoding on another apparatus at a different location, subject to the applicable decoding keys being known. A requirement for the coding and decoding at different locations is the calibration of the apparatus' in question, calibration in this context meaning the coincidence of the respective positions of lens systems and mirror assemblies with the same readings on the dial gauges 9 and 19 or equivalent devices contained in the two or more apparatus' concerned.

In the foregoing it was assumed throughout that the documentary subject would be in the form of a photographic film or plate suitable for insertion in the plateholder 22 (FIGURE 1). A different arrangement of the components of the device illustrated in FIGURE 1 enables documentary matter in its original form to be processed by placing the subject suitably illuminated at a suitable distance in a plane parallel to that of plateholder 22 (FIGURE 1). An example of such an arrangement is shown in form of a diagrammatic plan view in FIGURE 40. Analogous to FIGURE 1, FIGURE 40 shows in a housing 1 the plateholder 24, a mechanism 25 to adjust position of the plateholder 24, a reflecting mirror 23, a lens 2 mounted in the sliding plate 3, the mirror assembly 10, 11, 12, mounted in the rotating plate 14, and the dial gauges 9 and 19, indicating the positions of the lens 2 and the mirror assembly 10, 11, 12, respectively. The plateholder 20 into which a screen is to be inserted is positioned as shown in FIGURE 40. The arrangement illustrated diagrammatically in FIGURE 40 comprises an additional lens 195, which is mounted in a front wall of the housing and which is equipped with a focusing device and a shutter 196, the shutter 26 contained in the lens 2 (FIGURE 1) being omitted. The focus of the lens 2 (FIGURE 40) is preset to project the image produced in the plane of the plateholder 20 (FIGURE 40) onto a film held in plateholder 24 (FIGURE 40). The lens 195 can be focused on the subject placed at a suitable distance and projects the image of that subject onto a plane coinciding with the position of the plateholder 20 holding the screen. The broken line 13 represents the goemetrical centre of an image projected in the described manner which coincides with the geometrical centre 36 of the area of the film held in plateholder 24, providing neither the lens 2 nor the mirror assembly 10, 11, 12, have been displaced from their normal or zero position. The coding and decoding processes follow the previously described procedures, and after decoding the reconstituted subject, can be projected onto a suitably positioned screen instead of onto a film held in plateholder 22 (FIGURE 1). The projected image can then be photographed by ordinary means.

Under certain conditions it may be desirable to produce the reconstituted documentary subject after decoding in a directly readable form instead of, or apart from, a photographic reproduction. This is achieved by a further modified arrangement of the components shown in FIGURE 1 an example of which is illustrated in the form of a diagrammatic plan view of FIGURE 41. In FIGURE 41 a dual version of the device illustrated in FIGURE 40 is shown, the housing 197 containing analogous to FIGURE 1 and FIGURE 40, two each of the following components, the plateholder 24, the mechanism 25, the reflecting mirror 23, the lens 2 mounted in the plate 3, the mirror assembly 10, 11, 12, mounted in the plate 14, the dial gauges 9 and 19 and the plateholder 20. The arrangement shown in FIGURE 41 comprises, furthermore, two deflecting mirrors 198 and 198A, a beam splitting device such as a prism 199 and a lens 200, the latter being mounted in a front wall of the housing. The housing 197 is divided by a vertical partition 201 for the greater part of its length and further divisions 202 and 202A enclose the plateholders 24 and 24A respectively in light-tight compartments. The lenses 2 and 2A, FIGURE 41, are each equipped with a shutter 26 and 26A as shown also in FIGURE 1. The lens 200, FIGURE 41, has a focusing device and need not contain a shutter.

The image of a documentary subject placed at a suitable distance in front of the lens 200 in a plane parallel to the plateholders 20 and 20A is projected by the lens 200 onto the beam splitting device 199 which divides the light beam 13 representing the geometrical centre of the projected image into two diverging separate beams of preferably equal intensity onto the reflecting mirrors 198 and 198A respectively. The resulting two light beams 203 and 203A each representing the centre of the subject's projected image, correspond each to the light beam 13 (FIGURE 40 and FIGURE 1) coinciding with the geometrical centres 36 and 36A of the plateholders 24 and 24A respectively, providing the lenses 2 and 2A, and the mirror assemblies 10, 11, 12, and 10A, 11A, 12A, have not been displaced from their normal or zero position. The lens 200 projects the subject's image via the beam splitting device 199 and the deflecting mirrors 198 and 198A onto a plane coinciding with the plateholders 20 and 20A respectively. The lenses 2 and 2A are preset to project the image produced in the plane of plateholders 20 and 20A respectively onto the films held in plateholders 24 and 24A respectively. The coding and decoding processes follow the previously described procedures, and after decoding the reconstituted subject can be projected onto a suitably positioned screen instead of onto a film held in plateholder 22 (FIGURE 1). The projected image can then be photographed by ordinary means.

The dual arrangement shown in FIGURE 41 facilitates many of the described coding and decoding procedures: whenever decoding is effected by what was described as sequential projection a directly readable reconstitution of the original subject is projected onto a suitably positioned screen by inserting one file copy into the plateholder 24 (FIGURE 40) and the other into the plateholder 24A (FIGURE 41), then inserting the appropriate screens into the plateholders 20 and 20A and applying the relevant displacement factors. The two images are combined in the beam splitting device 199 and the resulting image combination can be projected through the lens 200 (FIGURE 41).

Coding procedures resulting in two file copies are also facilitated by the arrangement shown in FIGURE 41. When two file copies are to be produced from the same subject utilising two screens, the subject's image is projected via the lens 200 and the beam splitting device 199 onto the plateholders 20 and 20A respectively. According to the screen inserted into the plateholders 20 and 20A respectively, two different image combinations are recorded on the films held in plateholders 24 and 24A respectively. This obviates the otherwise necessary changing of screens during the coding process.

The arrangement illustrated in FIGURE 41 also facilitates the production of a screen and its reversal from a master pattern. When the image of this pattern is projected as described onto two films held in plateholders 24 and 24A, respectively, FIGURE 41, one of the films can be of suitable reversal material or can be treated by a reversal process thereby obviating the otherwise necessary reversing of a screen by contact printing or similar processes.

I claim:

1. A method for forming a coded representation of a documentary subject on a photographic sensitized surface comprising the steps of:

sequentially projecting the subject and a screen having translucent and opaque areas onto said surface, the image of said screen and subject on said sensitized surface having predetermined translational and rotational displacement factors; and forming a second coded representation for sequentially projecting onto a second photographic sensitive surface, the said subject and a reversal of said screen, applying for the sequential exposure of said second sensitive surface, displacement factors which are the same for subject exposures but which may be different from the displacement factors applied in the production of said first coded representation, the first and second coded representations being such that decoding can be effected photographically by sequentially projecting onto a photographic sensitized surface, said first and second coded representations and for such decoding exposures, applying displacement factors which correspond to the displacement factors applied in making said first and second coded representations.

2. The method of claim 1 wherein said first coded representation is produced by projecting simultaneously onto said surface, said subject and a first screen a given displacement factor being applied for such simultaneous projection and secondly by projecting simultaneously onto the initially exposed surface, a reversal of said subject and a reversal of said first screen, the same given displacement factors being applied for this second simultaneous projection, and wherein said second coded representation is the reversal of said first coded representation, said coded representation being such that decoding can be effected in two steps, the first decoding step comprising the simultaneous projection onto a sensitized surface of the first coded representation and said first screen, applying the displacement factors used in the production of said first coded representation, and the second decoding step comprising the simultaneous projection onto said last mentioned sensitized surface of said second coded representation and the reversal of said first screen, the same displacement factors being applied as in the production of said second coded representation.

3. A method as claimed in claim 2 wherein said second coded representation is produced by firstly projecting onto a sensitized surface, the subject simultaneously with a reversal of said screen, and then projecting onto that surface a reversal of said subject simultaneously with said screen, the same displacement factors being applied during both of such simultaneous exposures.

4. Apparatus for the photographic coding or decoding of a documentary subject, said apparatus comprising a housing, first and second object holder spaced from one another and carried by the housing, optical means for projecting an image of a subject from one holder to the other for the photographic exposure of a sensitized surface, said optical means including a lens system carried by a support displaceably mounted within the housing, and including also a combination of light-reflective surfaces for reflecting light rays away from and back to a main path of the light, displacement means to enable an image when projected from one holder for said photographic exposure to be displaced in position relatively to the other holder by an optionable and measurable displacement factor, said displacement means including mechanism for guiding and moving said support and lens system by a desired amount in a plane perpendicular to the optical axis of said lens system, and including also mechanism for rotatably mounting within the housing a support for said combination of light-reflective surfaces so that, during operation of the apparatus, the position of an image projected from one holder can be displaced by said displacement factor relatively to the other holder.

5. Apparatus as claimed in claim 4, wherein adjustment means is provided for adjusting the position of a holder relatively to the housing.

6. Apparatus as claimed in claim 4, wherein the housing is provided with location marks disposed adjacent a holder so that a representation of such location marks can be transferred photographically to a sensitized surface of an element located in said holder and, after removal of such element from the holder, the marks can facilitate accurate reregistration of the element when the latter is repositioned in a holder of the apparatus.

7. Apparatus as claimed in claim 4, wherein the first holder is located within the interior of the housing in a plane parallel to a front wall thereof and wherein a focussing lens system is mounted in said front wall so that said lens system can be focussed on a subject located in front of the apparatus and an image of such subject can be projected onto the plane of said first holder.

8. Apparatus as claimed in claim 4, wherein components comprising said object holders and said image projecting means, together with the displacement means and associated control mechanism, are disposed in a first section of the housing, and wherein the housing includes a second section similar to and located at the side of the said first section, the second section being provided internally with components corresponding to those of said first section, said housing having also a front wall, a focussing lens system mounted in the front wall, a beam splitting device mounted within the housing rearwardly of said focussing lens system, and a beam deflecting element disposed in each section, the latter elements being disposed one at each side of said beam splitting device, so that an image projected between the first and second holders of each of said sections can correspond to a single image projected between said focussing lens system and said beam splitting device.

References Cited

UNITED STATES PATENTS

| | | | |
|---|---|---|---|
| 2,437,255 | 3/1948 | Hogan et al. | 88—24 X |
| 2,531,974 | 11/1950 | Ellett | 88—24 X |

NORTON ANSHER, *Primary Examiner.*

R. A. WINTERCORN, *Assistant Examiner.*